US008649272B2

(12) United States Patent  
Besset et al.

(10) Patent No.: US 8,649,272 B2  
(45) Date of Patent: Feb. 11, 2014

(54) METHODS, SYSTEMS AND COMPUTER READABLE MEDIA FOR MOBILE-COMMUNICATION-DEVICE-INITIATED NETWORK MONITORING SERVICES

(75) Inventors: Philippe Besset, Rixheim (FR); Olivier Terrien, Chapel Hill, NC (US); Peter J. Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 216 days.

(21) Appl. No.: 13/109,696

(22) Filed: May 17, 2011

(65) Prior Publication Data

US 2011/0310744 A1      Dec. 22, 2011

Related U.S. Application Data

(60) Provisional application No. 61/345,566, filed on May 17, 2010.

(51) Int. Cl.  
*H04J 1/16* (2006.01)

(52) U.S. Cl.  
USPC ........... 370/241; 370/338; 370/328; 455/517; 455/524; 455/525

(58) Field of Classification Search  
USPC ......... 370/252, 241, 242, 248, 229, 230, 338, 370/328; 709/220, 224; 455/517, 524, 525  
See application file for complete search history.

(56) References Cited

U.S. PATENT DOCUMENTS

| | | | |
|---|---|---|---|
| 4,464,543 A | 8/1984 | Kline et al. | |
| 4,959,849 A | 9/1990 | Bhusri | |
| 5,008,929 A | 4/1991 | Olsen et al. | |
| 5,438,570 A | 8/1995 | Karras et al. | |
| 5,592,530 A | 1/1997 | Brockman et al. | |
| 5,638,431 A | 6/1997 | Everett et al. | |
| 5,757,895 A | 5/1998 | Aridas et al. | |
| 5,809,121 A | 9/1998 | Elliott et al. | |
| 5,867,558 A | 2/1999 | Swanson | |
| 5,892,812 A | 4/1999 | Pester, III | |
| 5,999,616 A | 12/1999 | Fellner et al. | |
| 6,052,448 A | 4/2000 | Janning | |
| 6,137,876 A | 10/2000 | Wong et al. | |

(Continued)

FOREIGN PATENT DOCUMENTS

WO    WO 2005/069898 A2    8/2005

OTHER PUBLICATIONS

Communication Pursuant to Article 94(3) EPC for European Patent Application No. 05705816.6 (May 29, 2012).

(Continued)

*Primary Examiner* — Dady Chery  
(74) *Attorney, Agent, or Firm* — Jenkins, Wilson, Taylor & Hunt, P.A.

(57) ABSTRACT

Methods, systems, and computer readable media for mobile communication device-initiated network monitoring services are disclosed. According to one aspect, a method for monitoring communications in a mobile networking environment by a core network probe-based monitoring system includes detecting, by an agent residing on a mobile communication device, a quality of service or customer experience triggering event; responding to the event by generating a message which includes information about that particular subscriber or device; and, transmitting that message to the network monitoring system to automatically trigger the monitoring system to monitor communications involving that mobile communication device.

35 Claims, 9 Drawing Sheets

(56) References Cited

U.S. PATENT DOCUMENTS

| | | |
|---|---|---|
| 6,243,458 B1 | 6/2001 | Fellner et al. |
| 6,249,572 B1 | 6/2001 | Brockman et al. |
| 6,282,267 B1 | 8/2001 | Nolting |
| 6,327,350 B1 | 12/2001 | Spangler et al. |
| 6,345,087 B1 | 2/2002 | Batham |
| 6,351,453 B1 | 2/2002 | Nolting et al. |
| 6,359,976 B1 | 3/2002 | Kalyanpur et al. |
| 6,381,306 B1 | 4/2002 | Lawson et al. |
| 6,385,301 B1 | 5/2002 | Nolting et al. |
| 6,393,113 B1 | 5/2002 | Karras |
| 6,400,813 B1 | 6/2002 | Birnhak |
| 6,456,845 B1 | 9/2002 | Drum et al. |
| 6,483,907 B1 | 11/2002 | Wong et al. |
| 6,498,843 B1 | 12/2002 | Cox |
| 6,515,968 B1 | 2/2003 | Combar et al. |
| 6,539,082 B1 | 3/2003 | Lowe et al. |
| 6,765,990 B2 | 7/2004 | Freedman et al. |
| 7,248,868 B2 | 7/2007 | Snyder et al. |
| 7,286,647 B2 | 10/2007 | Stormon et al. |
| 7,328,262 B2 | 2/2008 | McDonagh et al. |
| 2002/0071530 A1 | 6/2002 | Hannigan |
| 2002/0072358 A1 | 6/2002 | Schneider et al. |
| 2003/0105850 A1 | 6/2003 | Lean et al. |
| 2004/0008717 A1 | 1/2004 | Verma et al. |
| 2004/0114741 A1 | 6/2004 | Ngo et al. |
| 2004/0120350 A1 | 6/2004 | Moisey et al. |
| 2005/0003838 A1 | 1/2005 | McCann et al. |
| 2008/0091815 A1 | 4/2008 | Rao |
| 2009/0135731 A1* | 5/2009 | Secades et al. ............... 370/252 |

OTHER PUBLICATIONS

Supplementary European Search Report for European application No. 05705816.6 (Oct. 20, 2010).

Notice of Allowance and Fee(s) Due for U.S. Appl. No. 11/037,532 (Aug. 8, 2007).

Notification of European publication number and information on the application of Article 67(3) EPC for European application No. 05705816.6 (Dec. 6, 2006).

Notification of Transmittal of the International Search Report and the Written Opinioin of the International Searching Authority, or the Declaration for International Application No. PCT/US2005/001454 (Oct. 11, 2006).

Official Action for U.S. Appl. No. 11/037,532 (Sep. 26, 2006).

Harry Newton, "Newton's Telecom Dictionary," pp. 120-121, 237, 238 and 621 (1998).

Tekelec, "Template Trap and Trace (TEMPMAST)," 910-5008-02, Tekelec TA, pp. i-7-52, (Feb. 1989).

* cited by examiner

METHODS, SYSTEMS AND COMPUTER READABLE MEDIA FOR MOBILE-COMMUNICATION-DEVICE-INITIATED NETWORK MONITORING SERVICES

PRIORITY CLAIM

This application claims the benefit of U.S. Provisional Patent Application Ser. No. 61/345,566, filed May 17, 2010; the disclosure of which is incorporated herein by reference in its entirety.

TECHNICAL FIELD

The subject matter described herein relates to methods and systems for network monitoring of quality service provided to subscribers in a communication network. More particularly, the subject matter described herein relates to methods, systems and computer readable media for mobile-communication-device-initiated network services.

BACKGROUND

The quality of service and customer experience of subscribers of a communication network can significantly affect a network service provider's business. Customers are prone to switch service providers, such as their cell phone carrier, if they experience problems with their service, e.g. bad coverage, dropped calls, slow data transfer speeds, etc. It is important for service providers to be aware of problems their subscribers are experiencing so the problem can be proactively addressed and resolved.

There are disadvantages associated with current mechanisms by which service providers monitor issues customers are having with communications services. Historically, customers have had to call customer care when they experience difficulties with their services. This practice places the burden on the customer to report problems and can be quite time-consuming and frustrating to the customer.

Alternatively, some devices, e.g., some mobile phones, can have installed software to collect and store that device's usage data to be reported to the service provider when a customer experiences an issue. However, this type of software consumes the internal memory of the phone as it must store a large amount of data about the device, and its usage, on the device itself, to later be communicated to the service provider. Additionally, such installed software may only be capable of generating reports and may not be integrated with other network monitoring capabilities of a service provider.

Some networks have probe-based monitoring systems that copy signaling and bearer channel data at various network interfaces. Such systems are designed to monitor message traffic for accounting security, network planning, and other purposes. However, such probe-based network monitoring systems fall short of proactively addressing customer quality of service issues.

Accordingly, in light of these disadvantages associated with conventional monitoring of network subscribers, there exists a need for improved methods and systems for service providers to automatically monitor, in the network, customers experiencing quality of service issues.

SUMMARY

According to one aspect, the subject matter described herein includes a method for monitoring communications in a mobile networking environment by a core network probe-based monitoring system. The steps include detecting, by an agent residing on a mobile communication device, a quality of service or customer experience triggering event; responding to the event by generating a message which includes information about that particular subscriber or device; transmitting that message to the network monitoring system which automatically initiates the monitoring of communications involving that mobile communication device.

According to another aspect, the subject matter described herein includes a system for monitoring communications in a mobile networking environment. The system includes an agent locatable on a mobile communication device which detects a quality of service or customer experience triggering event, responds to the event by generating a message which includes information about that particular subscriber or device, and transmits that message to the network monitoring system, which then automatically triggers the network monitoring system to monitor signaling messages.

The subject matter described herein for mobile communication device-initiated network monitoring services may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "core network probe-based monitoring system" refers to a collection of hardware devices, referred to as link probes, that copy signaling messages and that provide those signaling messages to a central platform for storage and/or analysis. The term "agent" refers to hardware, software, or firmware that executes on a communication device to communicate with the core network probe-based monitoring system. As used herein, the term "core network" refers to the portion of the network through which signaling messages used for call setup and/or mobility management are exchanged.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for mobile communication device-initiated network monitoring services. When a customer of a mobile communication network experiences poor quality of service, such as dropped calls or an inability to connect to their email, an agent on the mobile device registers this event and generates a message which includes information identifying the subscriber and/or the device. The agent then sends this message to a core network probe-based monitoring system. This message automatically triggers the monitoring system to monitor communications involving the subscriber who experienced the quality of service issue, and, if desired, take further action to rectify the situation.

Reference will now be made in detail to exemplary embodiments of the present invention, examples of which are illustrated in the accompanying drawings. Wherever possible, the same reference numbers will be used throughout the drawings to refer to the same or like parts.

Figure 1A:
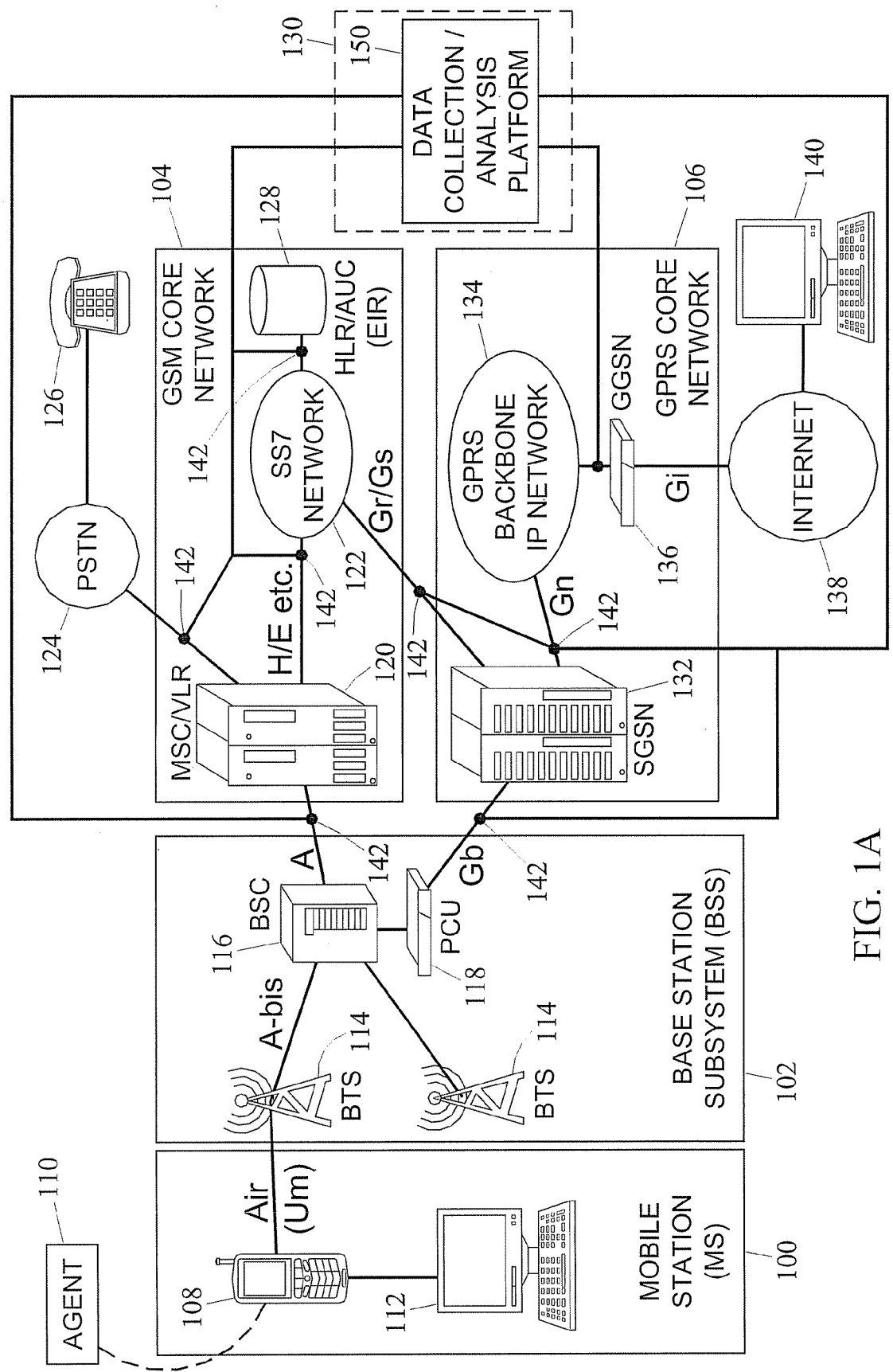
FIG. 1A is a block diagram illustrating an exemplary agent on a mobile communication device and a core network probe-based monitoring system according to an embodiment of the subject matter described herein.

FIG. 1A is a block diagram illustrating an exemplary agent on a mobile communication device and a core network probe-based monitoring system according to an embodiment of the subject matter described herein. In FIG. 1A, a mobile station (MS) 100 is connected to a communication network comprising a base station subsystem (BSS) 102, a GSM core network 104, and a GPRS core network 106. Although GSM and GPRS network examples are described herein, communication network can alternatively be an IS-41, UMTS, LTE, IMS, SIP, WiFi, WiMax or other voice or data networking environment.

Mobile station 100 can be any suitable subscriber communication device, such as a mobile phone 108, a personal digital assistant (PDA), a mobile broadband card, a laptop, a netbook, or other electronic device capable of communicating with a network, and may optionally be connected to additional hardware such as a general-purpose computer 112. Mobile station 100 also includes an agent 110 whose function will be described in detail below.

Mobile station 100 communicates over an air interface with a base transceiver station (BTS) 114, which is a component of base station subsystem 102. Other components of base station subsystem 102 include base station controller (BSC) 116 which is connected to packet control unit (PCU) 118. BSC 116 communicates with mobile switching center/visitor location register (MSC/VLR) 120 via the A interface. PCU 118 communicates with serving GPRS support node (SGSN) 132 via the Gb interface, thereby connecting BSS 102 to GSM core network 104 and GPRS core network 106. MSC/VLR 120 and SGSN 132 are each connected to SS7 network 122, connecting GSM core network 104 and GPRS core network 106 to one another. A home location register/authentication center/equipment identity register (HLR/AUC/EIR) 128, which performs subscriber and device data management and authentication services for subscribers in GSM core network 104. MSC/VLR 120 provides mobile switching service and registration services to roaming subscribers. A black phone 126 is contactable by subscribers of GSM core network 104 or GPRS core network 106 via PSTN 124.

In GPRS core network 106, SGSN 132 provides packet switching and registration services for subscribers of GPRS core network 106. Gateway GPRS support node (GGSN) 136 allows GPRS subscribers to connect to the Internet 138 and to devices, such as computer 140 that are connected to the Internet 138.

Core network probe-based monitoring system 130 includes various probes 142 connected to interfaces throughout the core network, i.e. GSM core network 104, GPRS core network 106, and BSS 102. As stated above, a probe is a piece of hardware that copies signaling messages and/or bearer data packets from a link interface or from a network node. In the illustrated example, link probes 142 are connected to the $G_N$ interface, the $G_R/G_S$ interface, the SS7 network 122 interface to HLR/AUC/EIR 128, the SS7 interface of MSC/VLR 120, the PSTN interface of MSC/VLR 120, the A interface, the $G_B$ interface, and the GGSN interface of GPRS backbone IP network 134. It is understood that probes 142 connected to additional interfaces without departing from the scope of the subject matter described herein. Core network probe-based monitoring system 130 also includes a data collection/analysis platform 150.

Figure 1B:
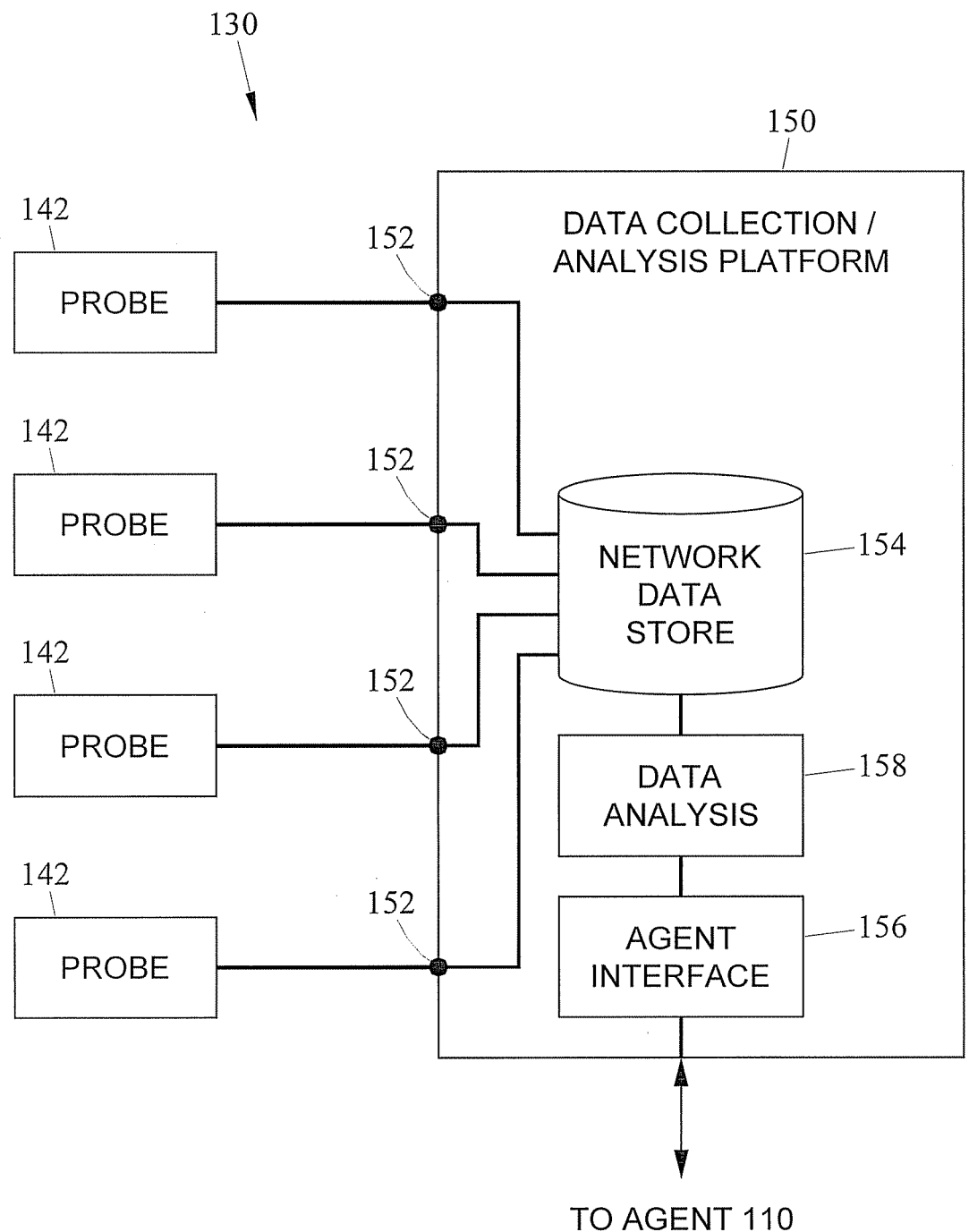
FIG. 1B is a block diagram illustrating an exemplary core network probe-based monitoring system according to an embodiment of the subject matter described herein.

FIG. 1B illustrates an example of exemplary components of data collection/analysis platform 150 and probes 142. Referring to FIG. 1B, data collection/analysis platform 150 includes a plurality of probe interfaces 152 for receiving copied signaling messages and/or bearer data packets from link probes 142. Received messages copied from probes 142 are stored in network data store 154. Data collection/analysis platform 150 also includes an agent interface 156 for communicating with agent 110. Agent 110 on mobile communications device 108 may communicate with data collection/analysis platform 154 via any suitable means. For example, agent 110 may be configured with the IP address, phone number, or other address of agent interface 156. Agent 110 may be configured to send a message to data collection/analysis platform 150 via any available interface of mobile communications device 108. For example, if the data communications capabilities of mobile communications device 108 are disabled, the message may be sent over GSM core network 104. In another example, if the data communications capabilities are available and the mobile phone communications capabilities are not available, the message may be sent to agent interface 156 via GPRS core network 106. When agent interface 156 receives a message from agent 110, that message triggers a data analysis module 158 to automatically begin monitoring messages relating to communications to or from the subscriber or device. Data analysis module 158 may analyze copied messages stored in data store 154. In addition, data analysis module 158 may configure link probes 142 to copy messages that are associated with communications to or from a particular subscriber or device.

Figure 2:
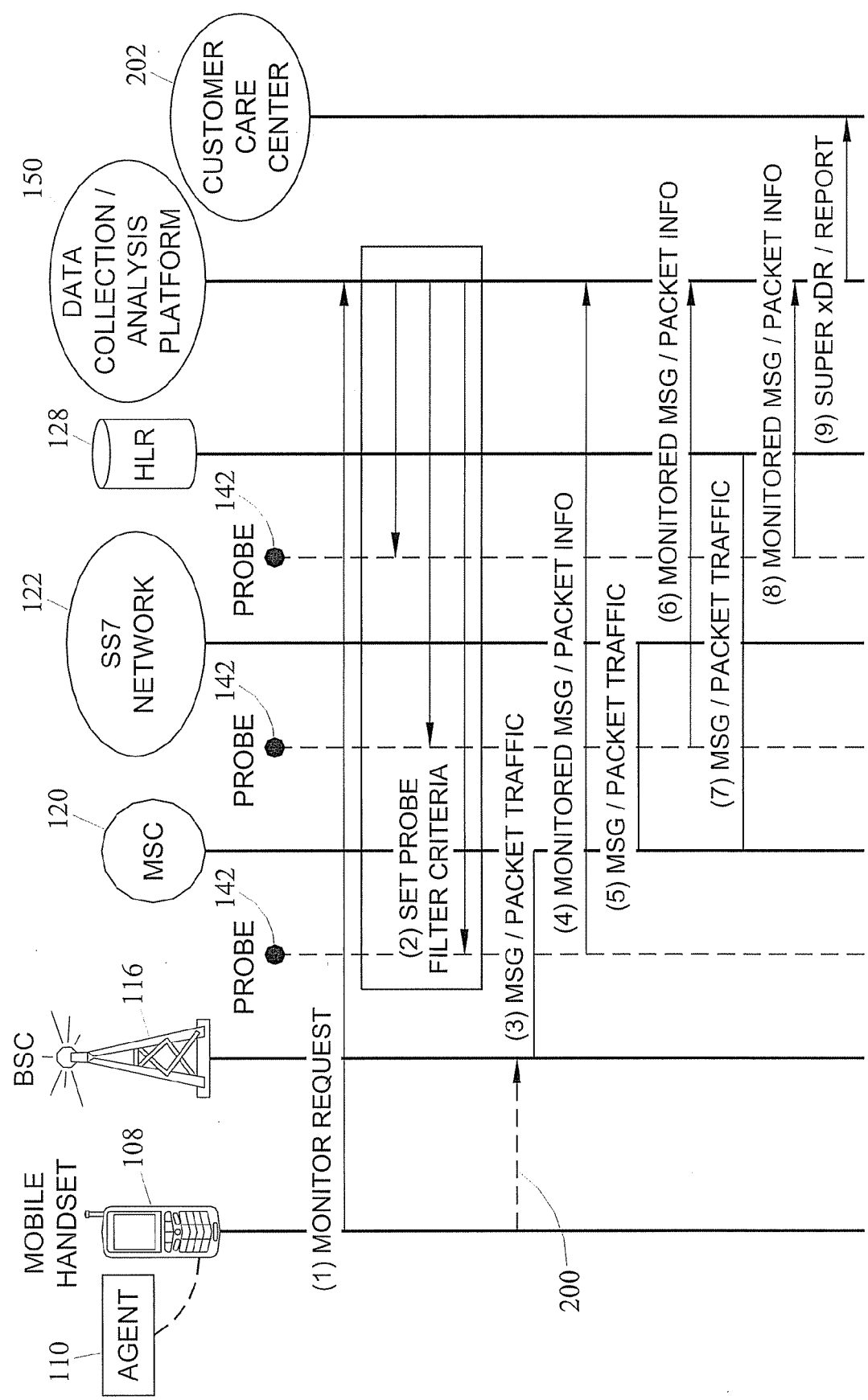
FIG. 2 is a signaling message flow diagram illustrating exemplary messages communicated between a mobile communication device and a core network probe-based monitoring system in a GSM network according to an embodiment of the subject matter described herein.

FIG. 2 is a signaling message flow diagram illustrating exemplary messages communicated between mobile communication device 108 and probe-based monitoring system 130 on GSM network 104 according to an embodiment of the subject matter described herein. A subscriber using mobile device 108, e.g. a mobile handset, experiences a poor quality of service event, for example, several dropped calls within a short period of time. In this example, agent 110 on mobile device 108 detects the dropped calls, and in step (1) automatically generates and sends a monitor request message to data collection/analysis platform 150 of monitoring system 130. Next, in step (2) data collection/analysis platform 150 sends filter criteria to probes 142 which are connected to the network at various interfaces, such as those between BSC 116 and MSC 120, between MSC 120 and SS7 network 122, or between SS7 network 122 and HLR 128.

As mobile device 108 sends out additional communications 200, message/packet traffic passes through various interfaces in steps (3), (5) and (7), where probes 142 screen message data for messages relating to communication to or from device 108, copy the identified messages, and send the copied information back to data collection/analysis platform 150 (steps 4, 6, and 8). Optionally, in one embodiment, in step (9) data collection/analysis platform 150 generates and sends a report, such as a call data record (CDR), internet protocol detail record (IPDR) or other data record, involving the customer or device, to customer care center 202.

Figure 3:
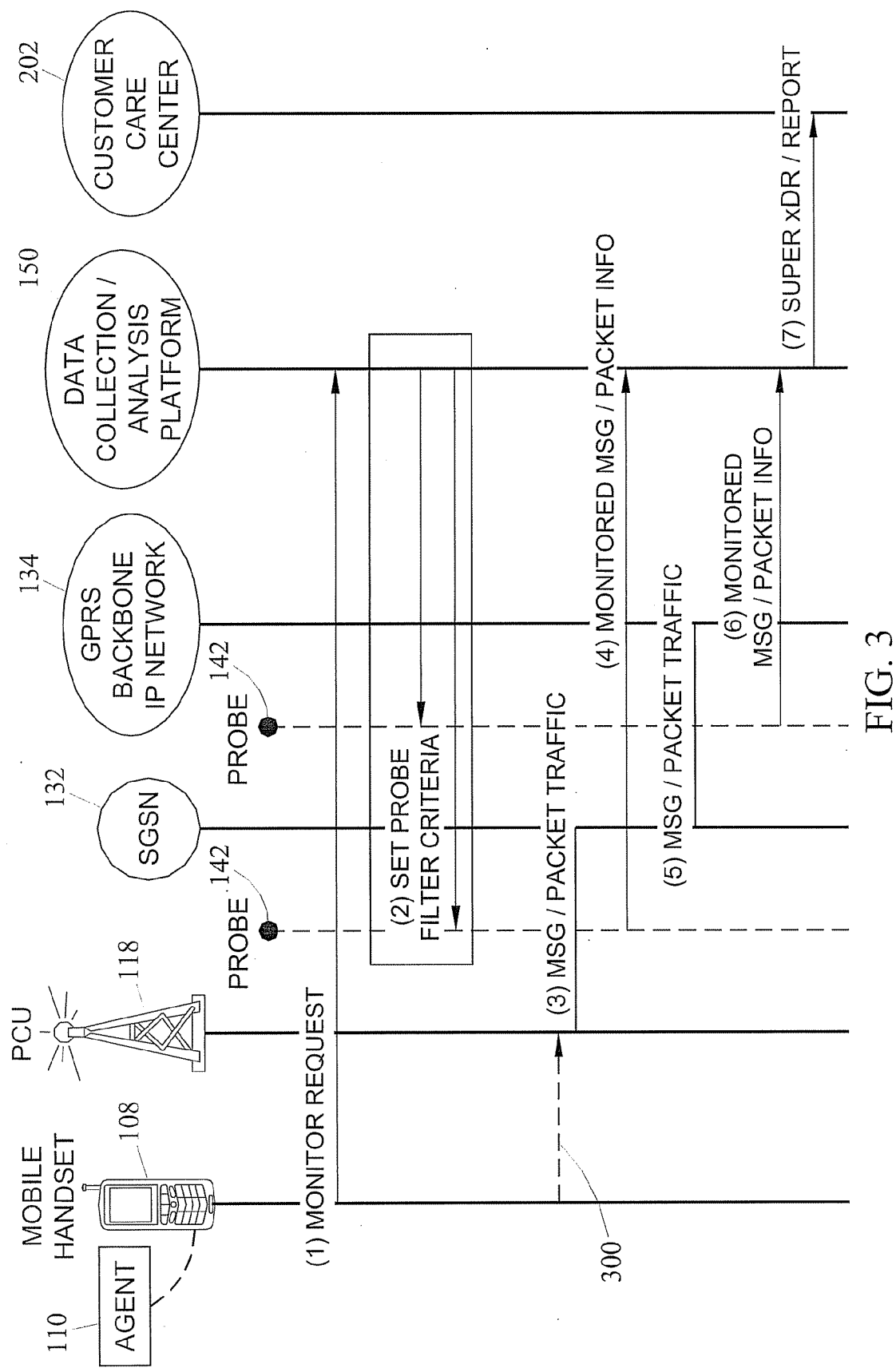
FIG. 3 is a signaling message flow diagram illustrating exemplary messages communicated between a mobile communication device and a core network probe-based monitoring system in a GPRS network according to an embodiment of the subject matter described herein.

FIG. 3 is a signaling message flow diagram illustrating exemplary messages communicated between mobile communication device 108 and probe-based monitoring system 130 on GPRS network 106 according to an embodiment of the subject matter described herein. A subscriber using mobile device 108, e.g. a mobile handset, experiences a poor quality of service event, for example, attempting to access his email three times and being unsuccessful each time. In this example, agent 110 on mobile device 108 detects the failed attempts and, after the third try, in step (1) automatically generates and sends a monitor request message to data collection/analysis platform 150 of monitoring system 130. Next, in step (2) data collection/analysis platform 150 sends filter criteria to probes 142 which are connected to the network at various interfaces, such as between PCU 118 and SGSN 132 or between SGSN 132 and GPRS backbone IP network 134.

As mobile device 108 sends out additional communications 300, message/packet traffic passes through the various interfaces in steps (3) and (5), where probes 142 screen message data for messages relating to communication to or from device 108, copy the identified messages, and send the copied information back to data collection/analysis platform 150 (steps 4 and 6). Optionally, in one embodiment, in step (7), data collection/analysis platform 150 generates and sends a report, such as a call data record (CDR), internet protocol detail record (IPDR) or other data record, involving the customer or device, to customer care center 202.

Figure 4:
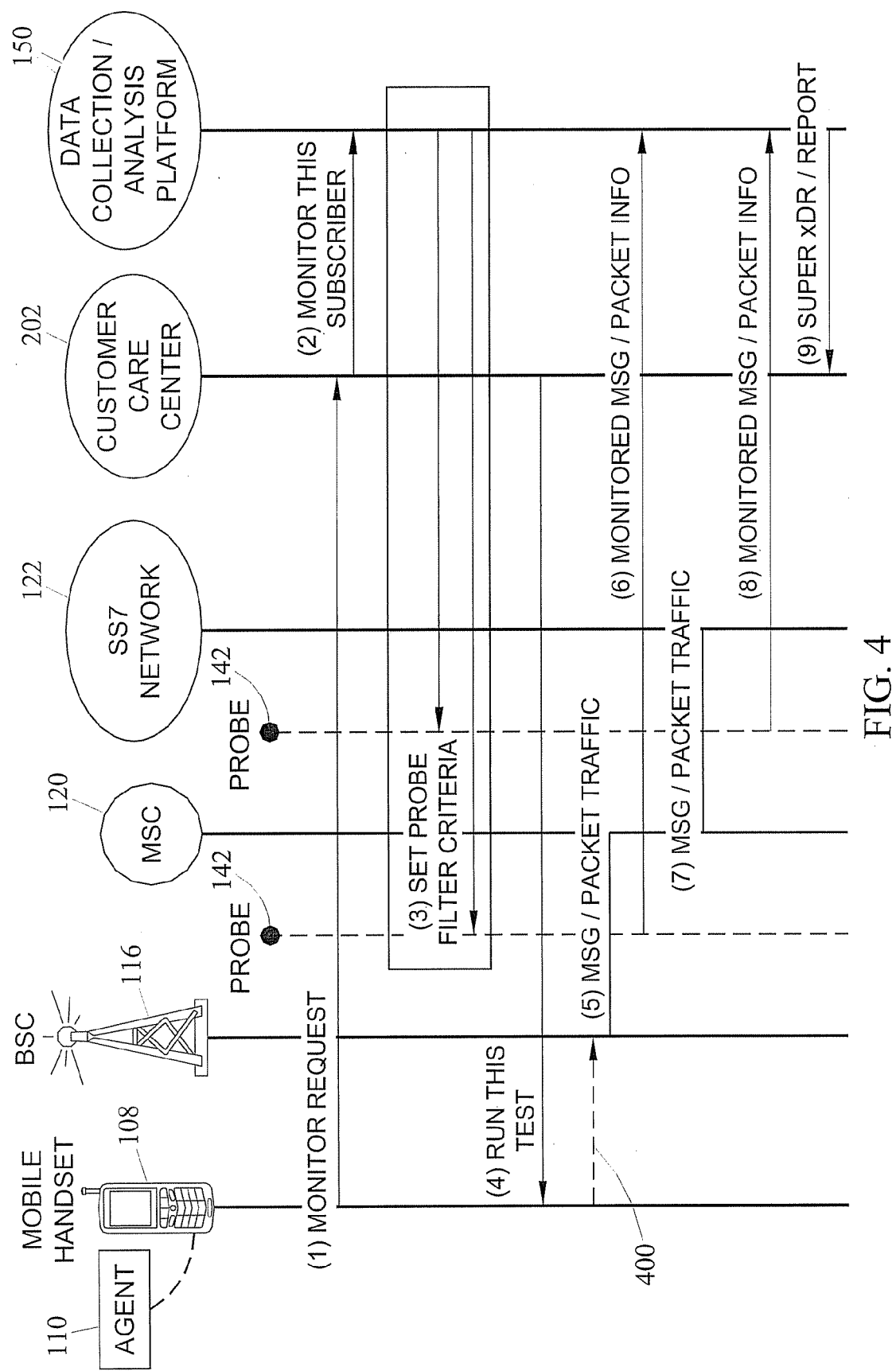
FIG. 4 is a signaling message flow diagram illustrating exemplary messages communicated between a mobile communication device and a customer care center which then triggers a probe-based monitoring system in a GSM network according to an embodiment of the subject matter described herein.

FIG. 4 is a signaling message flow diagram illustrating exemplary messages communicated between a mobile communication device and a customer care center which then triggers a probe-based monitoring system on a GSM network according to an embodiment of the subject matter described herein. A subscriber using mobile device 108, e.g. a mobile handset, experiences a poor quality of service event, for example, several dropped calls within a short period of time. In this example, agent 110 on mobile device 108 detects the dropped calls, and in step (1) automatically generates and sends a monitor request message to customer care center 202. Customer care center 202 then, in step (2), triggers data collection/analysis platform 150 to monitor this specific subscriber or device. In step (3), data collection/analysis platform 150 sends filter criteria to probes 142 which are connected to the network at various interfaces, such as between BSC 116 and MSC 120 or between MSC 120 and SS7 network 122. Customer care center 202 may also send a message back to mobile device 108 in step (4) instructing it to run a specific test or perform an action such as attempt to make a call, send an SMS message, or access data over the network, to aid in determining the exact nature of the problem.

As mobile device 108 sends out additional communications 400, message/packet traffic passes through various interfaces in steps (5) and (7), where probes 142 screen message data for messages relating to communication to or from device 108, copy the identified messages, and send the copied information back to data collection/analysis platform 150 (steps 6 and 8). Optionally, in one embodiment, in step (9) data collection/analysis platform 150 generates and sends a report, such as a call data record (CDR), internet protocol detail record (IPDR) or other data record involving the customer or device, to customer care center 202.

Figure 5:
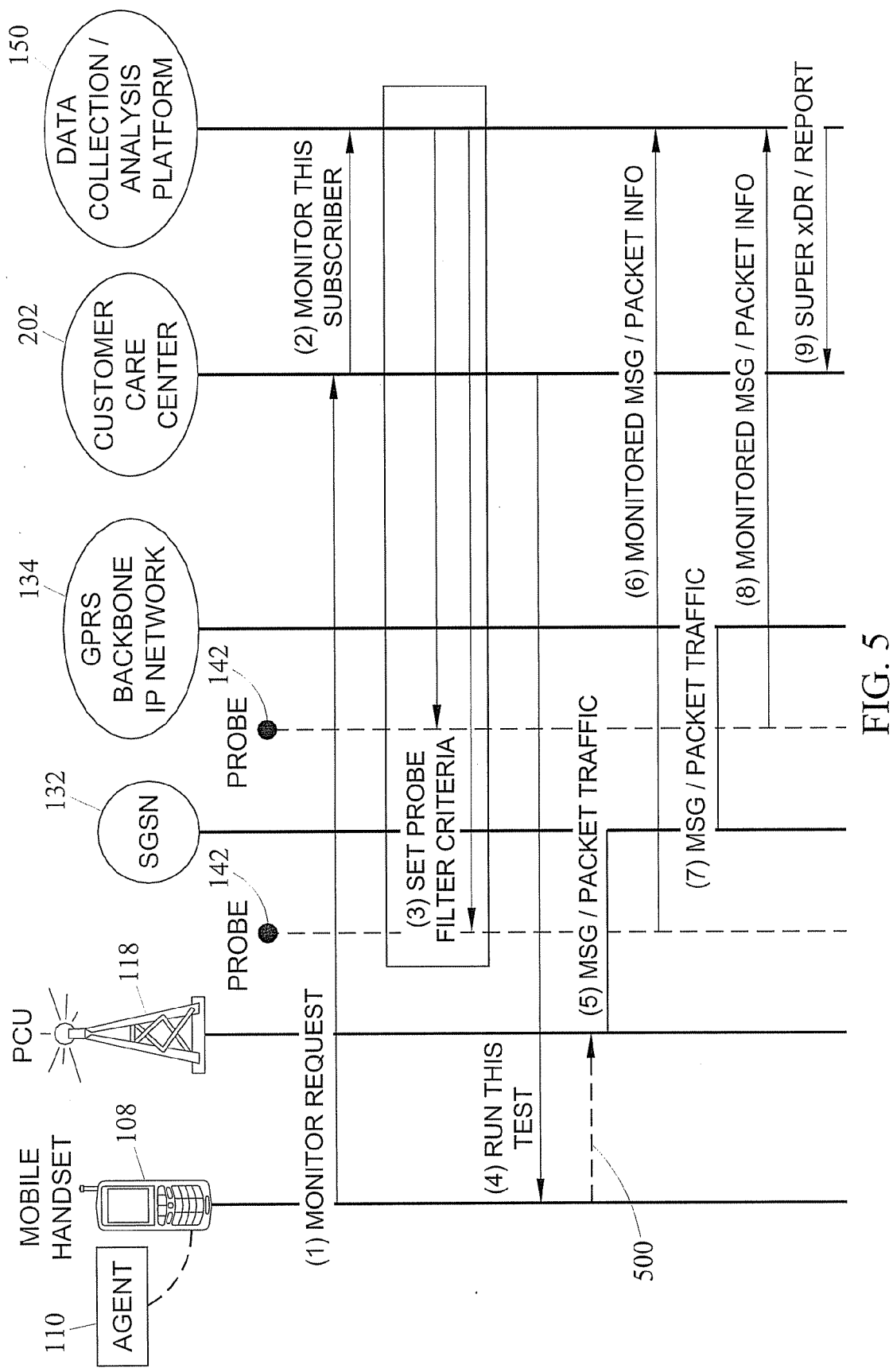
FIG. 5 is a signaling message flow diagram illustrating exemplary messages communicated between a mobile communication device and a customer care center which then triggers a core network probe-based monitoring system in a GPRS network according to an embodiment of the subject matter described herein.

FIG. 5 is a signaling message flow diagram illustrating exemplary messages communicated between a mobile communication device and a customer care center which then triggers a probe-based monitoring system on a GPRS network according to an embodiment of the subject matter described herein. A subscriber using mobile device 108, e.g. a mobile handset, experiences a poor quality of service event, for example, attempting to access his email three times and being unsuccessful each time. In this example, agent 110 on mobile device 108 detects the failed attempts and, after the third try, in step (1) automatically generates and sends a monitor request message to customer care center 202. Customer care center 202 then, in step (2), triggers data collection/analysis platform 150 to monitor this specific subscriber or device. In step (3), data collection/analysis platform 150 sends filter criteria to probes 142 which are connected to the network at various interfaces, such as between PCU 118 and SGSN 132 or between SGSN 132 and GPRS backbone IP network 134. Customer care center 202 may also send a message back to mobile device 108 in step (4) instructing it to run a specific test or perform an action such as attempt to make a call, send an SMS message, or access data over the network, to aid in determining the exact nature of the problem.

As mobile device 108 sends out additional communications 500, message/packet traffic passes through various interfaces in steps (5) and (7), where probes 142 screen message data for messages relating to communication to or from device 108, copy the identified messages, and send the copied information back to data collection/analysis platform 150. Optionally, in one embodiment, in step (9) data collection/analysis platform 150 then generates and sends a report, such as a call data record (CDR), internet protocol detail record (IPDR) or other data record involving the customer or device, to customer care center 202.

Figure 6:
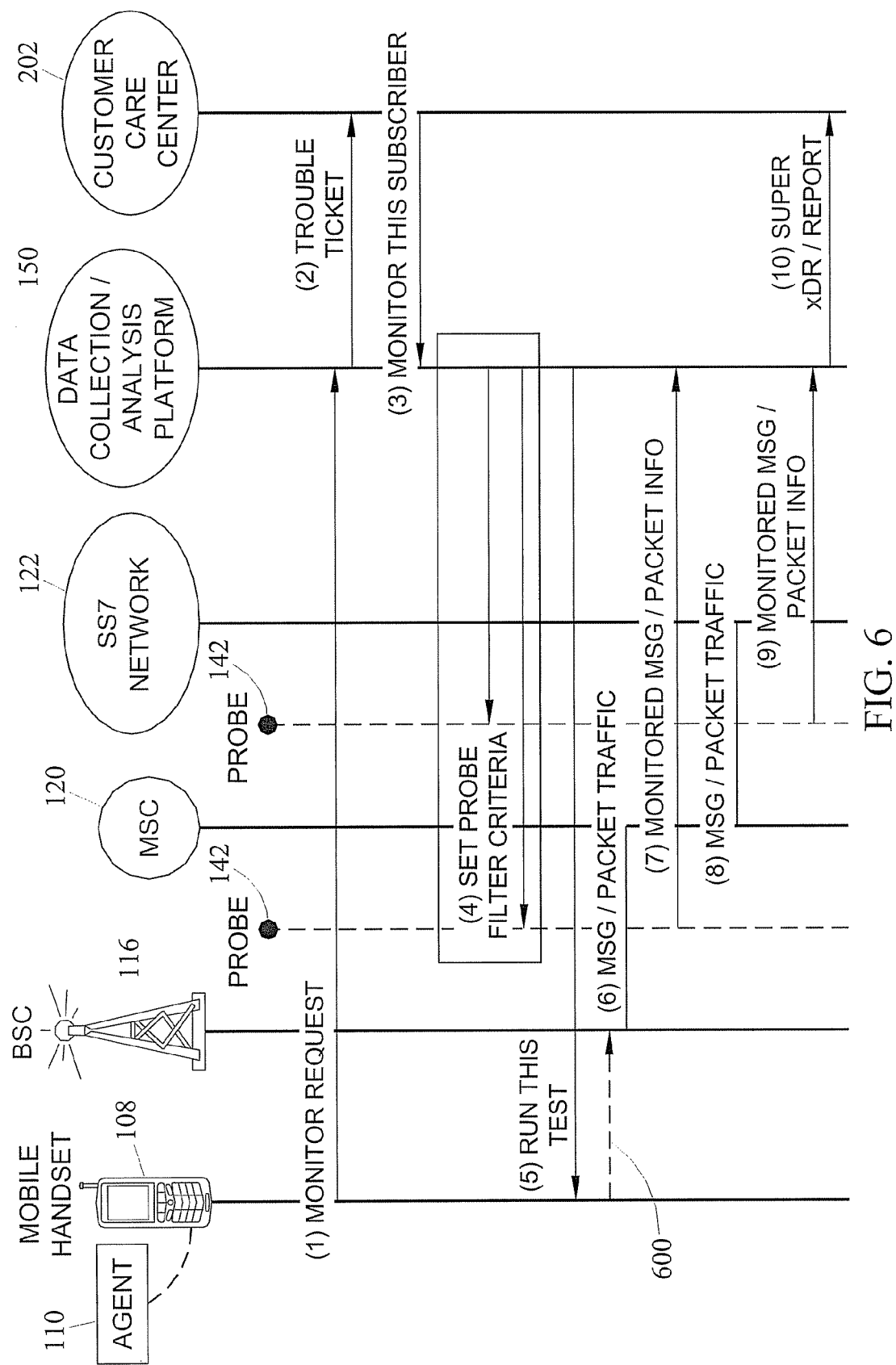
FIG. 6 is a signaling message flow diagram illustrating exemplary messages communicated between a mobile communication device and a probe-based monitoring system on a GSM network which then triggers a response by a customer care center, according to an embodiment of the subject matter described herein.

FIG. 6 is a signaling message flow diagram illustrating exemplary messages communicated between a mobile communication device and a probe-based monitoring system on a GSM network which then triggers a response by a customer care center, according to an embodiment of the subject matter described herein. A subscriber using mobile device 108, e.g. a mobile handset, experiences a poor quality of service event, for example, several dropped calls within a short period of time. In this example, agent 110 on mobile device 108 detects the dropped calls, and in step (1) automatically generates and sends a monitor request message to to data collection/analysis platform 150 of monitoring system. The customer may be an important customer to the service provider, such as an important business client, and the service provider may want to provide exceptional, proactive care to ensure the satisfaction of this important customer. Therefore, in such an example, the data collection/analysis platform 150 may automatically generate a trouble ticket and send it to a troubleshooter at customer care center 202, such as a technical support representative, in step (2). The representative at customer care center 202 then, in step (3), may trigger data collection/analysis platform 150 to monitor this specific subscriber or device. In step (4), data collection/analysis platform 150 may sends filter criteria to probes 142, which are connected to the network at various interfaces, such as between BSC 116 and MSC 120 or between MSC 120 and SS7 network 122. Data collection/analysis platform 150 may also send a message back to mobile device 108 in step (5) instructing it to run a specific test or perform an action such as attempt to make a call, send an SMS message, or access data over the network, to aid in determining the exact nature of the problem.

As mobile device 108 sends out additional communications 600, message/packet traffic passes through various interfaces in steps (6) and (8), where probes 142 screen message data for messages relating to communication to or from device 108, copy the identified messages, and send the copied information back to data collection/analysis platform 150 (steps 7 and 9). Optionally, in one embodiment, in step (10) data collection/analysis platform 150 generates and sends a report, such as a call data record (CDR), internet protocol detail record (IPDR) or other data record involving the customer or device, to customer care center 202. This report may also contain information about the core network, in addition to information about the specific mobile communication device.

Figure 7:
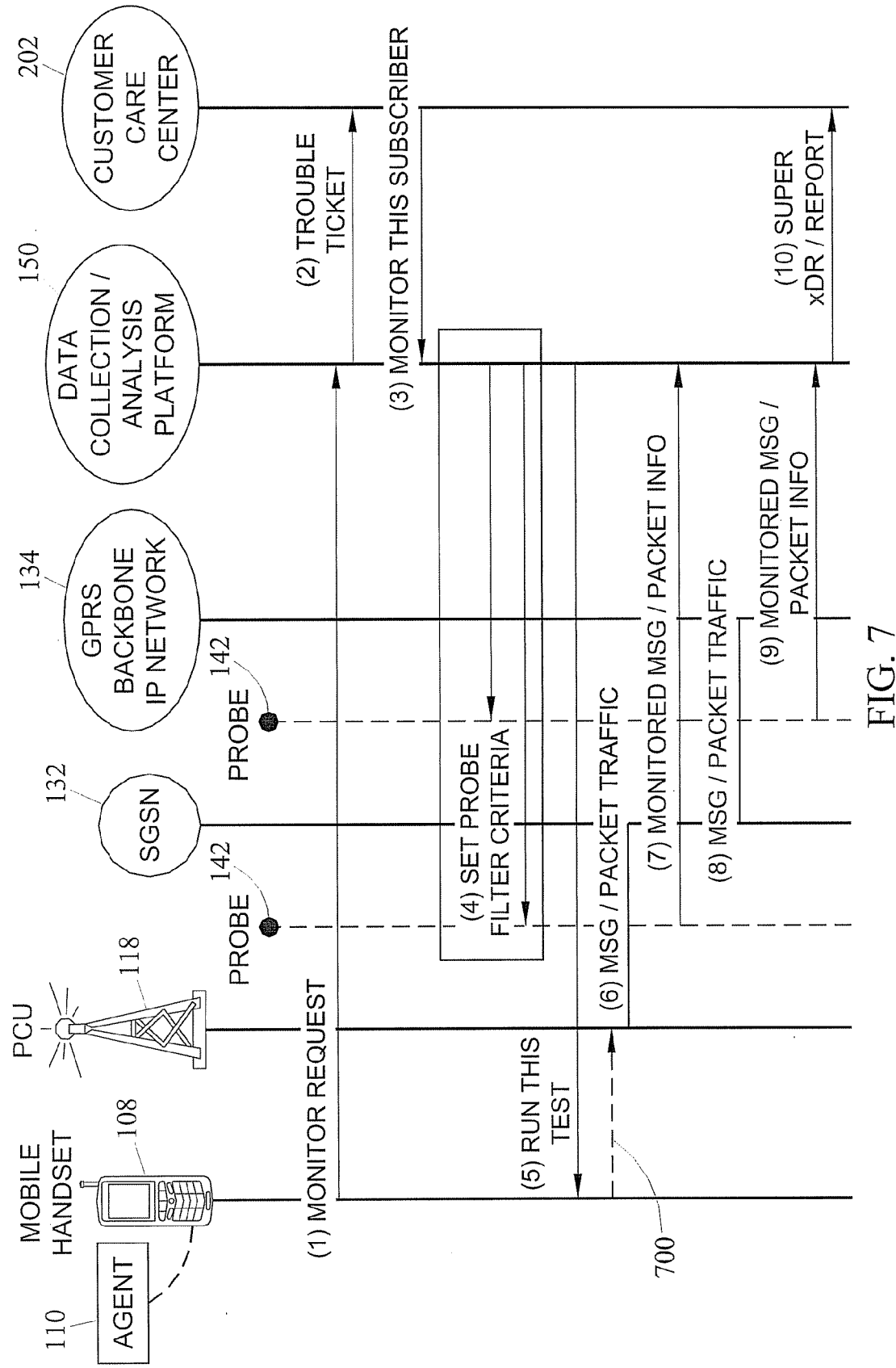
FIG. 7 is a signaling message flow diagram illustrating exemplary messages communicated between a mobile communication device and a probe-based monitoring system on a GPRS network which then triggers a response by a customer care center, according to an embodiment of the subject matter described herein.

FIG. 7 is a signaling message flow diagram illustrating exemplary messages communicated between a mobile communication device and a probe-based monitoring system on a GPRS network which then triggers a response by a customer care center, according to an embodiment of the subject matter described herein. A subscriber using mobile device 108, e.g. a mobile handset, experiences a poor quality of service event, for example, attempting to access his email three times and being unsuccessful each time. In this example, agent 110 on mobile device 108 detects the failed attempts and, after the third try, in step (1) automatically generates and sends a monitor request message to data collection/analysis platform 150 of monitoring system. The customer may be an important customer to the service provider, such as an important business client, and the service provider may want to provide exceptional, proactive care to ensure the satisfaction of this important customer. Therefore, in such an example, the data collection/analysis platform 150 may automatically generate a trouble ticket and send it to a troubleshooter at customer care center 202, such as a technical support representative, in step (2). The representative at customer care center 202 then, in step (3), may trigger data collection/analysis platform 150 to monitor this specific subscriber or device. In step (4), data collection/analysis platform 150 may send filter criteria to probes 142, which are connected to the network at various interfaces, such as between PCU 118 and SGSN 132 or between SGSN 132 and GPRS backbone IP network 134. Data collection/analysis platform 150 may also send a message back to mobile device 108 in step (5) instructing it to run a specific test or perform an action such as attempt to make a call, send an SMS message, or access data over the network, to aid in determining the exact nature of the problem.

As mobile device 108 sends out additional communications 700, message/packet traffic passes through various interfaces in steps (6) and (8), where probes 142 screen message data for messages relating to communication to or from device 108, copy the identified messages, and send the copied information back to data collection/analysis platform 150 (steps 7 and 9). Optionally, in one embodiment, in step (10) data collection/analysis platform 150 then generates and sends a report, such as a call data record (CDR), internet protocol detail record (IPDR) or other data record involving the customer or device, to customer care center 202. This report may also contain information about the core network, in addition to information about the specific mobile communication device.

Figure 8:
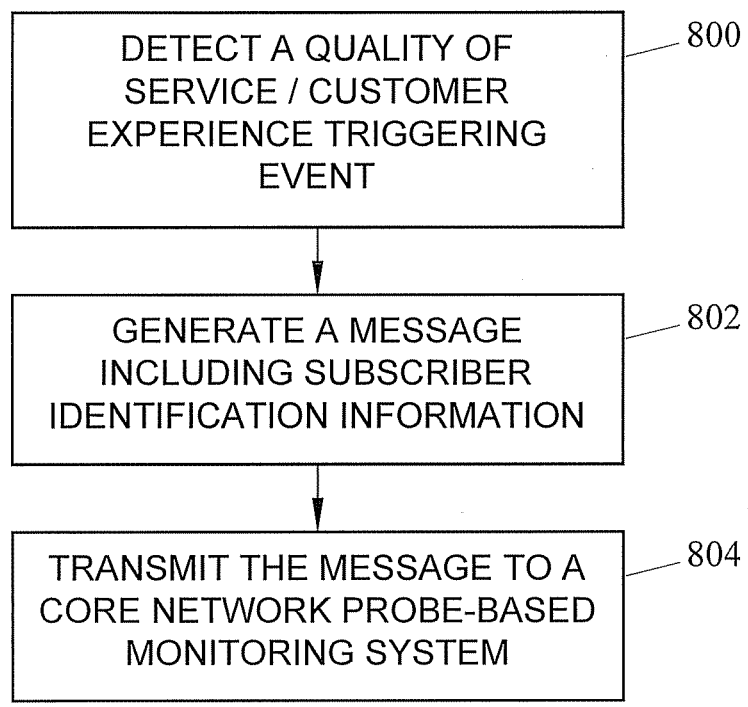
FIG. 8 is a flow chart illustrating an exemplary process for detecting a quality of service triggering event, generating a message including subscriber information in response to that event, and transmitting the message to a core network probe-based monitoring system according to an embodiment of the subject matter described herein.

FIG. 8 is a flow chart illustrating an exemplary process for detecting a quality of service triggering event, generating a message including subscriber information in response to that event, and transmitting the message to a monitoring system according to an embodiment of the subject matter described herein. In step 800, agent 110 on mobile communication device 108 detects a quality of service/customer experience triggering event. Examples of such an event may include dropped calls, loss of data connection, excessive latency, poor call quality, blocked calls, or any other experience of poor quality of service. In step 802, agent 110 generates a message which includes information about the subscriber or device experiencing the event, such as that subscriber's phone number. In step 804, agent 110 transmits this message to core network probe-based monitoring system 130.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for monitoring communications in a mobile networking environment, the method comprising:
    detecting, by an agent residing on a mobile communication device, a quality of service/customer experience triggering event;
    in response to detecting the quality of service/customer experience triggering event, generating a message which includes subscriber or device identification information;
    transmitting the message to a core network probe-based monitoring system that uses link probes to copy signaling messages and provide those signaling messages to a central platform for analysis; and
    at the core network probe-based monitoring system, receiving the message and automatically initiating the monitoring of messages associated with communications involving the mobile communication device, wherein the probe-based monitoring system uses the message to configure link probes to begin monitoring links for the messages associated with communications involving the mobile communication device.

2. The method of claim 1 wherein the triggering event is a failed communication attempt.

3. The method of claim 1 wherein the triggering event is excessive latency associated with a communication attempt.

4. The method of claim 1 wherein the triggering event is poor quality of service associated with a communication attempt.

5. The method of claim 1 wherein the triggering event is actuation of a hardware or software trigger associated with the mobile communication device.

6. The method of claim 1 wherein the message includes diagnostic information associated with the triggering event.

7. The method of claim 1 wherein, upon receipt of the message, the monitoring system further determines a monitoring action.

8. The method of claim 7 wherein the monitoring action includes accessing, by the monitoring system, previously collected mobile communication device and core network information associated with the mobile communication device.

9. The method of claim 7 wherein the monitoring action includes generating a report that includes at least a portion of the previously collected mobile communication device and core network information.

10. The method of claim 9 wherein the report is communicated to a customer care center associated with the network operator that serves the subscriber associated with the mobile communication device.

11. The method of claim 7 wherein the monitoring action includes sending a trouble ticket to a human troubleshooter associated with the network operator that serves the subscriber associated with the mobile communication device.

12. The method of claim 7 wherein the monitoring action includes instructing the mobile communication device to change elements of its network access configuration.

13. The method of claim 7 wherein the monitoring action includes communicating, to a mobile device management system, a subsequent operation required to be performed remotely on the mobile communication device.

14. The method of claim 13 wherein the subsequent operation includes initiating a diagnostic test.

15. The method of claim 7 wherein the monitoring action includes monitoring, at the mobile communication device, a subsequent operation or communication activity performed by the mobile communication device.

16. The method of claim 7 wherein the monitoring action includes monitoring in the core network subsequent message traffic that is sent to or from the mobile communication device.

17. The method of claim 16 wherein the monitoring action includes generating a report that includes at least a portion of the subsequently monitored core network message traffic and/or mobile communication device processing and communication activity.

18. A system for monitoring communications in a mobile networking environment, comprising:
an agent locatable on a mobile communication device; and
a core network probe-based monitoring system that uses link probes to copy signaling messages and provide those signaling messages to a central platform for analysis;
wherein the agent on the mobile communication device is configured for:
detecting a quality of service/customer experience triggering event;
in response to detecting the quality of service/customer experience triggering event, generating a message which includes subscriber or device identification information; and
transmitting the message to the core network probe-based monitoring system; and
wherein the message automatically triggers the core network probe-based monitoring system to monitor signaling messages, and wherein the probe-based monitoring system uses the message to configure link probes to begin monitoring links for the messages associated with communications involving the mobile communication device.

19. The system of claim 18 wherein the triggering event is a failed communication attempt.

20. The system of claim 18 wherein the triggering event is excessive latency associated with a communication attempt.

21. The system of claim 18 wherein the triggering event is poor quality of service associated with a communication attempt.

22. The system of claim 18 wherein the triggering event is actuation of a hardware or software trigger associated with the mobile communication device.

23. The system of claim 18 wherein the message includes diagnostic information associated with the triggering event.

24. The system of claim 18 wherein, upon receipt of the message, the monitoring system further determines a monitoring action.

25. The system of claim 24 wherein the monitoring action includes accessing, by the core network probe-based monitoring system, previously collected mobile communication device and core network information associated with the mobile communication device.

26. The system of claim 24 wherein the monitoring action includes generating a report that includes at least a portion of the previously collected mobile communication device and core network information.

27. The system of claim 26 wherein the report is communicated to a customer care center associated with the network operator that serves the subscriber associated with the mobile communication device.

28. The system of claim 24 wherein the monitoring action includes sending a trouble ticket to a human troubleshooter associated with the network operator that serves the subscriber associated with the mobile communication device.

29. The system of claim 24 wherein the monitoring action includes instructing the mobile communication device to change elements of its network access configuration.

30. The system of claim 24 wherein the monitoring action includes communicating to a mobile device management system a subsequent operation required to be performed remotely onto the mobile communication device.

31. The system of claim 30 wherein the monitoring action includes instructing the mobile communication device to initiate a diagnostic test.

32. The system of claim 24 wherein the monitoring action includes monitoring, at the mobile communication device, a subsequent operation or communication activity performed by the mobile communication device.

33. The system of claim 24 wherein the monitoring action includes monitoring in the core network subsequent message traffic that is sent to or from the mobile communication device.

34. The system of claim 33 wherein the monitoring action includes generating a report that includes at least a portion of the subsequently monitored core network message traffic and/or mobile communication device processing and communication activity.

35. A non-transitory computer readable medium having stored thereon executable instructions that, when executed by the processor of a computer, control the computer to perform steps comprising:
- detecting, by an agent residing on a mobile communication device, a quality of service/customer experience triggering event;
- in response to detecting the quality of service/customer experience triggering event, generating a message which includes subscriber or device identification information; and
- transmitting the message to a core network probe-based monitoring system that uses link probes to copy signaling messages and provide those signaling messages to a central platform for analysis to automatically trigger the probe-based monitoring system to configure the link probes to begin monitoring links for the messages associated with communications involving the mobile communication device.

* * * * *